United States Patent [19]
van Eersel

[11] Patent Number: 5,773,045
[45] Date of Patent: Jun. 30, 1998

[54] DEVICE FOR WORKING A DOUGH STRAND INTO A THIN DOUGH SHEET

[75] Inventor: Johannes C. van Eersel, Papendrecht, Netherlands

[73] Assignee: Sasib Bakery Holland N.V., Division Blom & Maters/MEA, Rijn, Netherlands

[21] Appl. No.: 736,389

[22] Filed: Oct. 24, 1996

[30] Foreign Application Priority Data

Apr. 26, 1994 [NL] Netherlands ............................ 9400672

[51] Int. Cl.$^6$ ............................................ A21C 3/02
[52] U.S. Cl. ............................ 425/371; 426/502; 100/151
[58] Field of Search ................................. 425/371, 372; 426/502; 100/151

[56] References Cited

U.S. PATENT DOCUMENTS

| | | | |
|---|---|---|---|
| 3,904,336 | 9/1975 | Axer et al. | 425/371 |
| 4,046,850 | 9/1977 | Kato et al. | 425/371 |
| 4,252,517 | 2/1981 | Milford et al. | 425/371 |
| 4,517,148 | 5/1985 | Churchland | 425/371 |
| 4,647,417 | 3/1987 | Bottger et al. | 425/371 |
| 5,454,304 | 10/1995 | Bielfeldt | 425/371 |

FOREIGN PATENT DOCUMENTS

| | | |
|---|---|---|
| 0140458 | 10/1984 | European Pat. Off. . |
| 0251138 | 1/1988 | European Pat. Off. . |
| 2454762 | 11/1980 | France . |
| 1004004 | 9/1965 | United Kingdom . |

*Primary Examiner*—Khanh P. Nguyen

[57] ABSTRACT

The device for working a dough strand into a thin dough sheet, comprises two superimposed endless conveyors the operative runs of which are facing one another and adapted to be driven in the same direction at the same speed. The operative runs confine a passage gap for the dough strand that gradually increases in height in the conveying direction. According to the invention, the operative run of the upper one of the two belt conveyors has, as seen in the conveying direction of the dough strand, a profile, that satisfies the equation:

$$Y_x = \frac{Y_o}{1+ax}$$

in which $Y_x$ is the perpendicular distance between the operative run of the upper belt conveyor and the lower, flat belt conveyor at a point x in the passage gap between the two operative runs, and wherein a is a measure for the length of the conveyance path.

2 Claims, 1 Drawing Sheet ial application PCT/NL 95/00152 with an international filing date of 25 Apr. 1995.

DEVICE FOR WORKING A DOUGH STRAND INTO A THIN DOUGH SHEET

CROSS-REFERENCE TO RELATED APPLICATION

This application is a continuation of international application PCT/NL 95/00152 with an international filing date of 25 Apr. 1995.

BACKGROUND OF THE INVENTION

1. Field of the Invention

The invention relates to a device for working a dough strand into a thin dough sheet, comprising two superimposed endless belt conveyors, the operative runs of which face one another and are adapted to be driven in the same direction at the same speed, the operative runs confining a passage gap for the dough strand that gradually decreases in height in the conveying direction.

2. Description of the Related Art Including Information Disclosed Under 37 CFR §§ 1.97–1.99

A device of this type is disclosed in FIG. 3 of EP-A-0 251 138, wherein the dough strand to be worked is previously formed from a multiplicity of shapeless lumps of dough. A device of this type can also be suitably used for further processing of the yield of a so-called continuous kneader. In such a kneader the required dough ingredients are mixed and kneaded to a substantially homogeneous dough strand that leaves the device through an outlet.

With the well-known device referred to above, the two facing runs of the two belt conveyors are completely flat along the entire length of the runs and consequently confine a passage gap, the height of which is linearly decreasing into the dough strand conveying direction up to the desired thickness of the dough sheet.

Dependent on the type of baking products which one desires, the obtained dough sheet is to be severed into pieces of 300–2000 grams. In practice, this severing takes place by cutting the dough sheet into lengths corresponding to the desired weights by means of a transverse cutter provided at the outlet of the device, the cutter being actuated with a frequency that is adjustable and dependent on the speed of the belt conveyors.

It has been experienced, that the dough sheet pieces thus obtained do not always have the desired weight and that pieces of equal length often differ too much in weight and often appear to be of an irregular structure.

SUMMARY OF THE INVENTION

It is an object of the invention to mitigate this drawback.

According to the invention this object is achieved by having the operative run of the upper one of the two belt conveyors, as seen in the conveying direction of the dough strand, a profile which is represented by the following equation:

$$Y_x = \frac{Y_o}{1 + ax}$$

in which $Y_x$ is the perpendicular distance between the operative run of the upper belt conveyor and the lower, flat belt conveyor at a point x in the passage gap between the two operative runs, wherein a is a measure for the length of the conveyance path and $Y_o$ is the selected height of the passage gap at the upstream end of the device.

With a device having a thus profiled operative run of the upper belt conveyor, there will be a linear increase of the width of the dough strand, as a result of which the dough will maintain its uniform structure. There will be no mutual displacements of dough particles in the conveying direction, due to which the final dough sheet will be substantially "stress free" in the longitudinal direction, so that the length of the dough sheet is forming a reliable measure for the weight.

It is to be noted that EP-A-0 140 458 discloses a device for rolling a dough layer into a continuous sheet, comprising superimposed conveyor structure that confine a passage gap which progressively increases in height when seen in the upstream direction. With this well-known device the upper conveyor structure is an assembly of freely rotatable rollers that are guided in an endless path, the lower or operative run of which, as seen in the conveying direction, has a hyperbolic profile. The lower conveyor structure comprises a series of transport rollers which are located under the upstream part of the upper conveyor structure and which are driven, either individually or in groups, at speeds which progressively faster in the downstream direction. Following the transport rollers there is provided an endless conveyor belt, located under the downstream end of the upper conveyor structure, the conveyor belt functioning as a discharge conveyor for the dough sheet and moving with a speed that is substantially slower than the speed of the adjacent transport roller(s).

BRIEF DESCRIPTION OF THE DRAWINGS

The invention will be hereinafter further described, by way of example, with reference to the drawings wherein.

DESCRIPTION OF THE PREFERRED EMBODIMENT(S)

Figure 2:
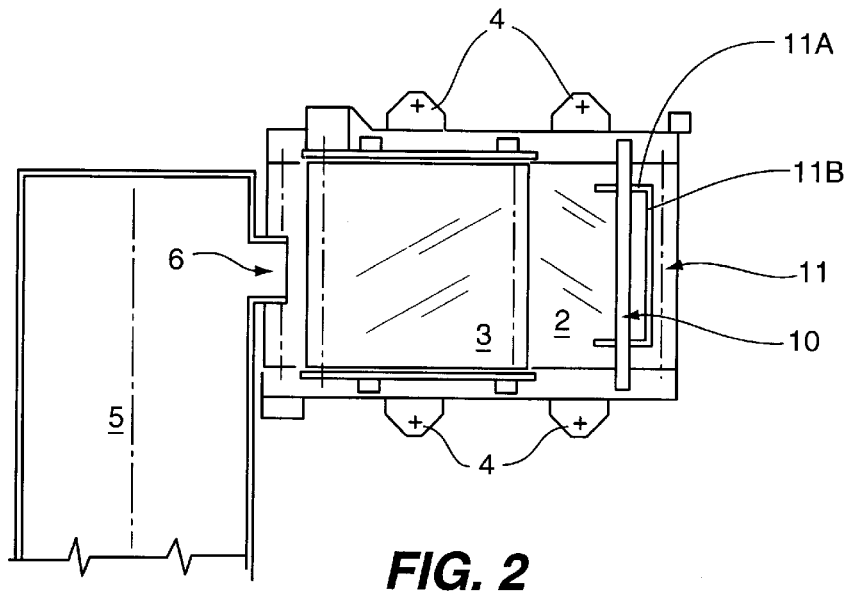
FIG. 2 is a plan view of the device shown FIG. 1.
Figure 1:
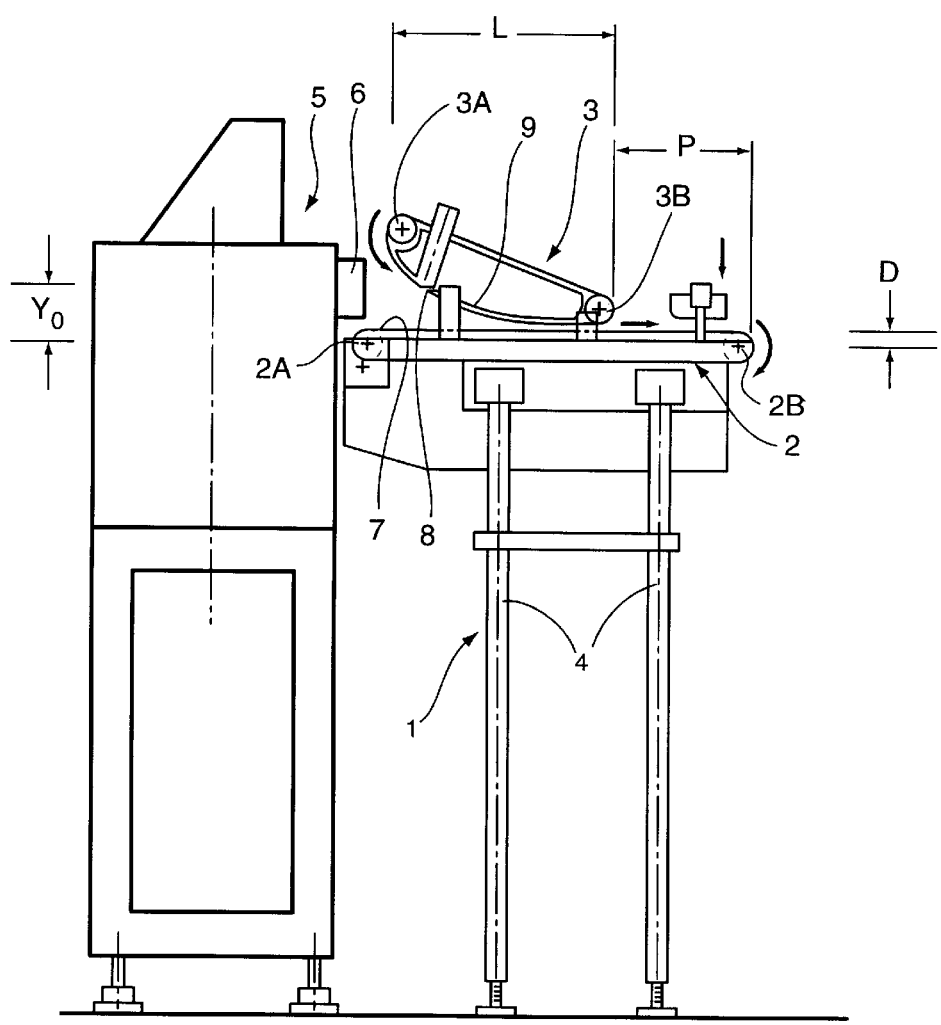
FIG. 1 is a side view of a device according to the invention placed behind the outlet of a continuous kneader.

The device according to the invention is indicated at 1 and comprises a lower, flat and horizontally arranged belt conveyor 2 and a belt conveyor 3 placed thereabove. This assembly of belt conveyors 2 and 3 is supported by a frame 4 that connects to the outlet side of a so-called continuous kneader indicated at 5.

The outlet mouth 6 of the kneader 5 is positioned midway above the left guide roller 2a of the lower belt conveyor 2, the upper run 7 of which confines, together with the lower run 8 of the upper belt conveyor 3, a passage gap for the dough strand that flows through the outlet mouth, the gap having a height that decreases as seen to the right. The two belt conveyors are driven at the same speed, which is dependent on the outlet speed of the dough strand, and in a direction such that the operative runs 7 and 8 are moving to the right.

The operative run 8 of the upper belt conveyor is guided across a profiled support plate 9 extending between the end rollers 3a and 3b.

The profile of the support plate 9 satisfies the following equation:

$$Y_x = \frac{Y_o}{1 + ax}$$

in which $Y_o$ is the height of the dough strand passage gap at the inlet side and $Y_x$ is the height of the passage gap at any location x of the passage trajectory, and a is a constant which is dependent on the length l of the passage trajectory.

The operative run 8 of the upper belt conveyor will thus be guided along a hyperbolic path, due to which the, e.g. cylindrical, dough strand leaving the mouth 6 will, while passing between the operative runs 7 and 8, proportionally increase in width, whereas its thickness decreases along the above equation to the final thickness or height d.

Thus, depending on the desired height d at the downstream outlet for the finished product, and knowing the upstream height, Yo, which is approximately the height of the mouth 6, and knowing the length l, one can easily determine a from $d(known)=Y_o(known)/(1+al(known))$.

This manner of treating the outflowing dough strand is characterized by the fact, that any cross-sectional slice of the outflowing dough strand will, when passing through the device, deform only in the transverse direction, so that in the conveying direction there will be no mutual displacements of dough particles and the final dough sheet will be stress free as seen in the conveying direction.

The dough sheet released adjacent the downstream guide roller 3b of the upper belt conveyor remains supported by the upper run 7 of the continuing lower belt conveyor along a distance p. Above this part of the lower belt conveyor, a cutter 11 carried by a cross beam 10 is provided, the side portions 11a of which will be cut off the marginal portions of the dough sheet, while the cross portion 11b will divide the dough sheet into longitudinal pieces. The cutter 11 is periodically driven, in a manner not further shown, with a frequency which is dependent on the speed at which the dough strand leaves the dough mouth 6 and which may be adjusted in dependence of the desired weight of the pieces to be severed from the dough sheet.

From the foregoing description, it will be apparent that the device for working a dough strand into a thin dough sheet of the present invention has a number of advantages, some of which have been described above and others of which are inherent in the invention. Also it will be understood that modifications can be made to the device for working a dough strand into a thin dough sheet described above without departing from the teachings of the present invention. Accordingly, the scope of the invention is only to be limited as necessitated by the accompanying claims.

I claim:

1. A device for working a dough strand into a thin dough sheet, comprising a framework, two superimposed endless belt conveyors mounted on said framework, one above the other, and each having an operative run facing the operative run on the other belt conveyor, said operative runs of each belt conveyor being driven in the same direction and at the same speed, said lower belt conveyor having a flat operative run, said operative runs defining therebetween a varying height passage gap having an inlet and an outlet and a length, l, between them, said gap having a height $Y_o$ at said inlet, said passage gap confining the dough strand passing therethrough, the height of said passage gap gradually decreasing in the conveying direction, wherein the operative run of the upper one of the two belt conveyors has, as seen in the conveying direction of the dough strand, a profile which is represented by the following equation:

$$Y_x = \frac{Y_o}{1 + ax}$$

in which $Y_x$ is the perpendicular distance between the operative run of the upper belt conveyor and the lower, flat belt conveyor at a point x in the passage gap between the two operative runs, wherein a is a constant related to the length of the passage gap and $Y_o$ is the height of said inlet for said passage gap.

2. A device according to claim 1 wherein the operative run of the upper belt conveyor is guided across a fixed profiled support plate having a profile according to said equation.

* * * * *